(12) United States Patent
Choi

(10) Patent No.: US 9,848,077 B2
(45) Date of Patent: Dec. 19, 2017

(54) ELECTRONIC DEVICE HAVING MULTIPLE SUBSCRIBER IDENTITY MODULES AND METHOD THEREFOR

(71) Applicant: Samsung Electronics Co., Ltd., Gyeonggi-do (KR)

(72) Inventor: Eun-Hee Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/722,467

(22) Filed: May 27, 2015

(65) Prior Publication Data

US 2015/0349852 A1    Dec. 3, 2015

(30) Foreign Application Priority Data

May 28, 2014   (KR) .................. 10-2014-0064238

(51) Int. Cl.
| | |
|---|---|
| H04B 5/00 | (2006.01) |
| H04M 3/38 | (2006.01) |
| H04M 1/73 | (2006.01) |
| H04M 1/725 | (2006.01) |
| G06Q 20/32 | (2012.01) |

(52) U.S. Cl.
CPC .......... *H04M 1/73* (2013.01); *G06Q 20/3229* (2013.01); *G06Q 20/3278* (2013.01); *H04M 1/7253* (2013.01); *H04M 1/72519* (2013.01); *H04M 1/72522* (2013.01); *H04M 2250/04* (2013.01)

(58) Field of Classification Search
CPC   H04B 5/0056; H04M 3/387; H04M 1/72522; H04M 1/73; G06K 7/10
See application file for complete search history.

(56) References Cited

U.S. PATENT DOCUMENTS

| | | | |
|---|---|---|---|
| 2006/0205435 A1* | 9/2006 | Lee ................... | H04M 1/72522 455/558 |
| 2010/0105375 A1* | 4/2010 | Schroter ............ | H04L 63/0853 455/419 |
| 2012/0001725 A1* | 1/2012 | Chen .................. | H04L 63/0492 340/5.6 |
| 2013/0023255 A1* | 1/2013 | Yang .................. | H04M 1/7253 455/418 |
| 2013/0169059 A1 | 7/2013 | Sun et al. | |
| 2014/0344083 A1* | 11/2014 | Rosenes ................ | G06Q 30/06 705/17 |
| 2015/0092611 A1* | 4/2015 | Ponukumati ........... | H04W 4/16 370/259 |

* cited by examiner

Primary Examiner — Andrew Wendell
(74) Attorney, Agent, or Firm — Cha & Reiter, LLC.

(57) ABSTRACT

A method is provided including: sensing that a reader is located within a preset distance from an electronic device; determining a Service Identification Module (SIM) from a plurality of SIMS that are available in the electronic device; and communicating with the reader using information stored in the SIM.

21 Claims, 18 Drawing Sheets

ELECTRONIC DEVICE HAVING MULTIPLE SUBSCRIBER IDENTITY MODULES AND METHOD THEREFOR

CROSS-REFERENCE TO RELATED APPLICATION

This application claims the priority under 35 U.S.C. §119(a) to Korean Application Serial No. 10-2014-0064238, which was filed in the Korean Intellectual Property Office on May 28, 2014, the entire content of which is hereby incorporated by reference.

TECHNICAL FIELD

Various embodiments of the present disclosure relates to electronic devices, and more particularly to an electronic device having multiple Subscriber Identify Modules (SIMs) and a method therefor.

BACKGROUND

In line with development of functions of electronic devices, technologies for using SIMs, which can store various kinds of user information, are drawing attention. An electronic device may have a SIM, in which various kinds of information can be stored, and thereby perform NFC (near-field communication) with a reader. For example, a user can use the SIM of his/her electronic device, in which payment information and the user's personal information are stored, as means for paying traffic fees and credit card charges and as various types of user authentication means, simply by tagging readers.

SUMMARY

According to one aspect of the disclosure, a method is provided including: sensing that a reader is located within a preset distance from an electronic device; determining a Service Identification Module (SIM) from a plurality of SIMS that are available in the electronic device; and communicating with the reader using information stored in the SIM.

According to another aspect of the disclosure, an electronic device is provided, comprising: a processor configured to sense that a reader is located within a preset distance of the electronic device, and determine a SIM from a plurality of SIMs; and a communication module configured to communicate with the reader using information stored in the SIM.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
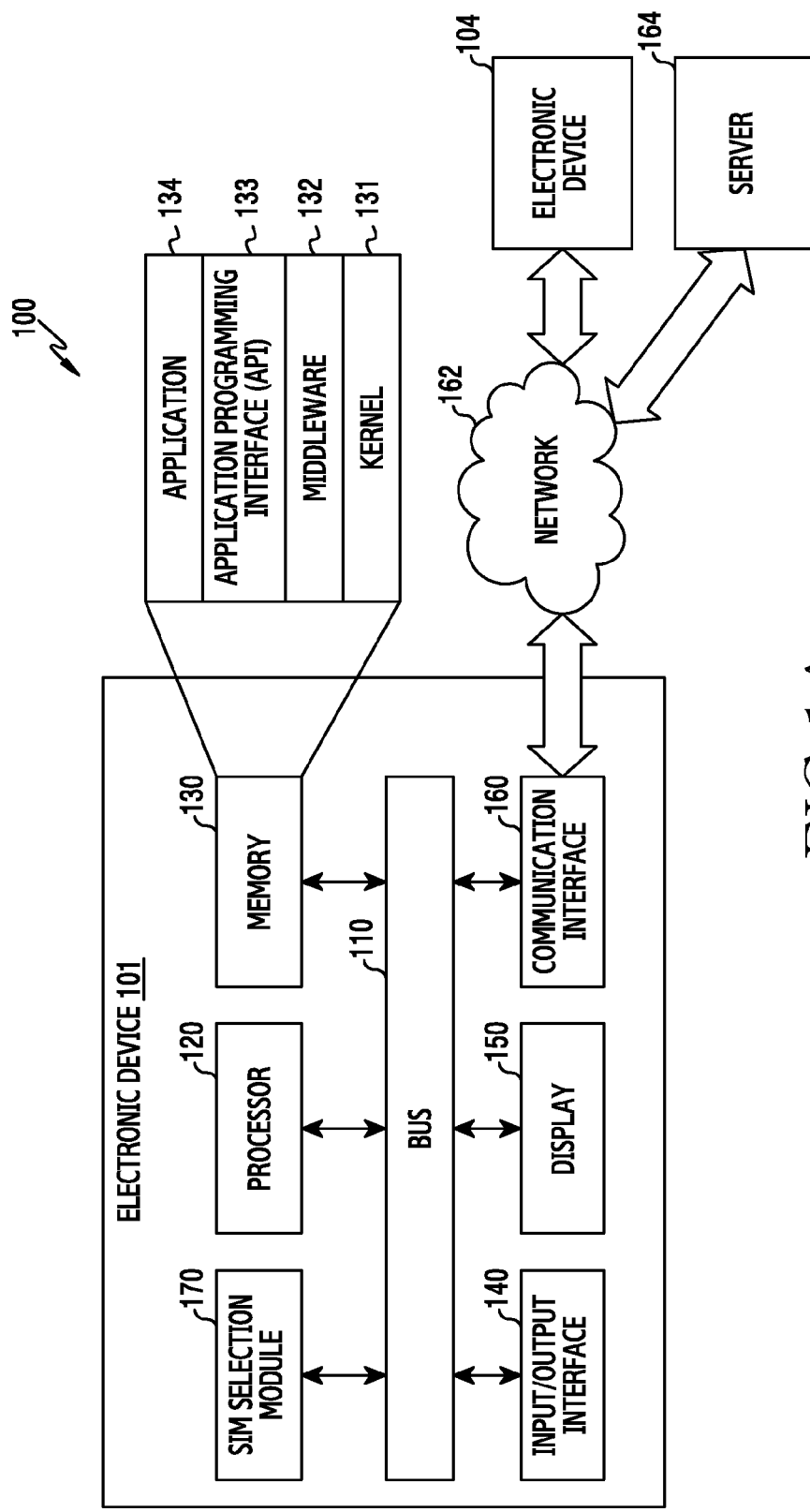
FIG. 1A is a diagram of an example of a network environment, according to various embodiments of the present disclosure.

Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. Further, as used in embodiment of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to an embodiment, an electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g. Magnetic Resonance Angiography (MRA), Magnetic Resonance Imaging (MRI), Computed Tomography (CT) machine, and an ultrasonic machine), navigation devices, Global Positioning System (GPS) receivers, Event Data Recorders (EDRs), Flight Data Recorders (FDRs), automotive infotainment devices, electronic equipments for ships (e.g. navigation equipments for ships, gyrocompasses, or the like), avionics, security devices, head units for vehicles, industrial or home robots, Automatic Teller Machines (ATM) of banking facilities, and Point Of Sales (POSs) of shops.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to various embodiments of the present disclosure may be a combination of one or more of above-described various devices. Also, an electronic device according to various embodiments of the present disclosure may be a flexible device. Also, an electronic device according to various embodiments of the present disclosure is not limited to the above-described devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1A is a diagram illustrating an example of a environment 100, according to various embodiments of the disclosure. The network environment 100 may include an electronic device 101, an electronic device 104, a server 164, and a network 162. Referring to FIG. 1A, the electronic device 101 may include a bus 110, a processor 120, a memory 130, an input/output interface 140, a display 150, a communication interface 160, and a SIM selection module 170.

The bus 110 may be a circuit for connecting the aforementioned elements and transmitting communication (e.g., a control message) between the aforementioned elements.

The processor 120 may include any suitable type of processing circuitry, such as one or more of a Field Programmable Gate Array (FPGA), a general-purpose processor (e.g., an ARM-based processor), an Application-Specific Integrated Circuit (ASIC), or a Digital Signal Processor (DSP). For example, the processor 120 may receive instructions from the aforementioned other elements (e.g., the memory 130, the input/output interface 140, the display 150, the communication interface 160, the SIM selection module 170, or the like) through the bus 110, decipher the received instructions, and perform calculation or data processing according to the deciphered instructions.

The memory 130 may store instructions or data received from or generated by the processor 120 or other elements (e.g., the input/output interface 140, the display 150, the communication interface 160, the SIM selection module 170, or the like). The memory 130 may include programming modules, for example, a kernel 131, middleware 132, an Application Programming Interface (API) 133, and applications 134. Each of the aforementioned programming modules may be formed of software, firmware, hardware, or a combination of at least two thereof.

The kernel 131 may control or manage system resources (e.g., the bus 110, the processor 120, or the memory 130) used for executing an operation or a function implemented in the remaining other programming modules, for example, the middleware 132, the API 133, or the applications 134. In addition, the kernel 131 may provide an interface through which the middleware 132, the API 133, or the applications 134 may control or manage the individual elements of the electronic device 101 while accessing the individual elements.

The middleware 132 may serve as an intermediary enabling the API 133 or the applications 134 to transfer data through communication with the kernel 131. Furthermore, in regard to task requests received from the applications 134, the middleware 132 may perform a control (e.g., scheduling or load balancing) for the task requests, using a method such as allocating at least one of the applications 134 a priority for using the system resources (e.g., the bus 110, the processor 120, and the memory 130) of the electronic device 101.

The API 133 is an interface through which the applications 134 may control functions provided by the kernel 131 and the middleware 132 and may include at least one interface or function (e.g., instruction) for file control, window control, image processing, or text control.

According to various embodiments, the applications 134 may include a Short Message Service (SMS)/Multimedia Message Service (MMS) application, an email application, a calendar application, an alarm application, a health care application (for example, application measuring the amount of exercise or blood sugar) or an environment information application (for example, application providing information on atmospheric pressure, humidity or temperature). Additionally or alternately, the applications 134 may be applications related to an information exchange between the electronic device 101 and an external electronic device (e.g., an electronic device 104). The applications related to the exchange of information may include, for example, a notification relay application for transferring predetermined information to the external electronic device or a device management application for managing the external electronic device.

For example, the notification relay application may include a function of transferring, to the external electronic device (for example, the electronic device 104), notification information generated from other applications of the electronic device 101 (for example, an SMS/MMS application, an e-mail application, a health care application, an environmental information application, and the like). Additionally or alternatively, the notification relay application may receive notification information from, for example, the external electronic device (e.g., the electronic device 104) and provide the received notification information to a user. For example, the device management application may manage (e.g., install, delete, or update) functions for at least a part of the external electronic device (e.g., the electronic device 104) communicating with the electronic device 101 (e.g., turning on/off the external electronic device itself (or some elements thereof) or adjusting brightness (or resolution) of a display), applications operating in the external electronic device, or services (e.g., a telephone call service or a message service) provided by the external electronic device.

According to various embodiments, the applications 134 may include an application designated according to an attribute (for example, type of electronic device) of the external electronic device (for example, electronic device 104). For example, in a case where the external electronic device is an MP3 player, the applications 134 may include an application related to the playback of music. Similarly, in the case where the external electronic device is a mobile medical appliance, the applications 134 may include an application related to health care. According to an embodiment, the applications 134 may include at least one of an application designated to the electronic device 101 and an application received from the external electronic device (e.g., a server 106 or the electronic device 104).

The input/output interface 140 may transfer instructions or data input from a user through an input/output device (e.g., the sensor, a keyboard, or a touch screen) to, for example, the processor 120, the memory 130, the communication interface 160, or the SIM selection module 170 through the bus 110. For example, the input/output interface 140 may provide, to the processor 120, data regarding a user's touch input through the touch screen. Furthermore, through the input/output device (e.g., a speaker or a display), the input/output interface 140 may output instructions or data received from the processor 120, the memory 130, the communication interface 160, or the SIM selection module 170 through the bus 110. For example, the input/output interface 140 may output voice data, processed through the processor 120, to a user through a speaker.

The display 150 may display various pieces of information (e.g., multimedia data or text data) to a user.

The communication interface 160 may connect communication between the electronic device 101 and the external electronic device (e.g., the electronic device 104 or the server 106). For example, the communication interface 160 may be connected to a network 162 through wireless or wired communication to communicate with the external device. The wireless communication may include at least one of, for example, Wireless Fidelity (Wi-Fi), Bluetooth (BT), Near Field Communication (NFC), a Global Positioning System (GPS), and cellular communication (e.g., Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to one embodiment, the network 162 may be a telecommunications network. The communication network may include at least one of a computer network, the Internet, the Internet of things, and a telephone network. According to one embodiment, a protocol (e.g., a transport layer protocol, data link layer protocol, or a physical layer protocol) for communication between the electronic device 101 and the external device may be supported by at least one of the applications 134, the application programming interface 133, the middleware 132, the kernel 131, and the communication interface 160.

The SIM selection module 170 may be connected to one SIM, according to the user's selection, among at least two SIMs provided. According to one embodiment, the SIM selection module 170 may be positioned between an NFC (near-field communication) IC (integrated circuit) and at least two SIMs, determine one SIM from among the at least two SIMs according to the user's selection, and connect the determined SIM with the NFC IC.

Figure 1B:
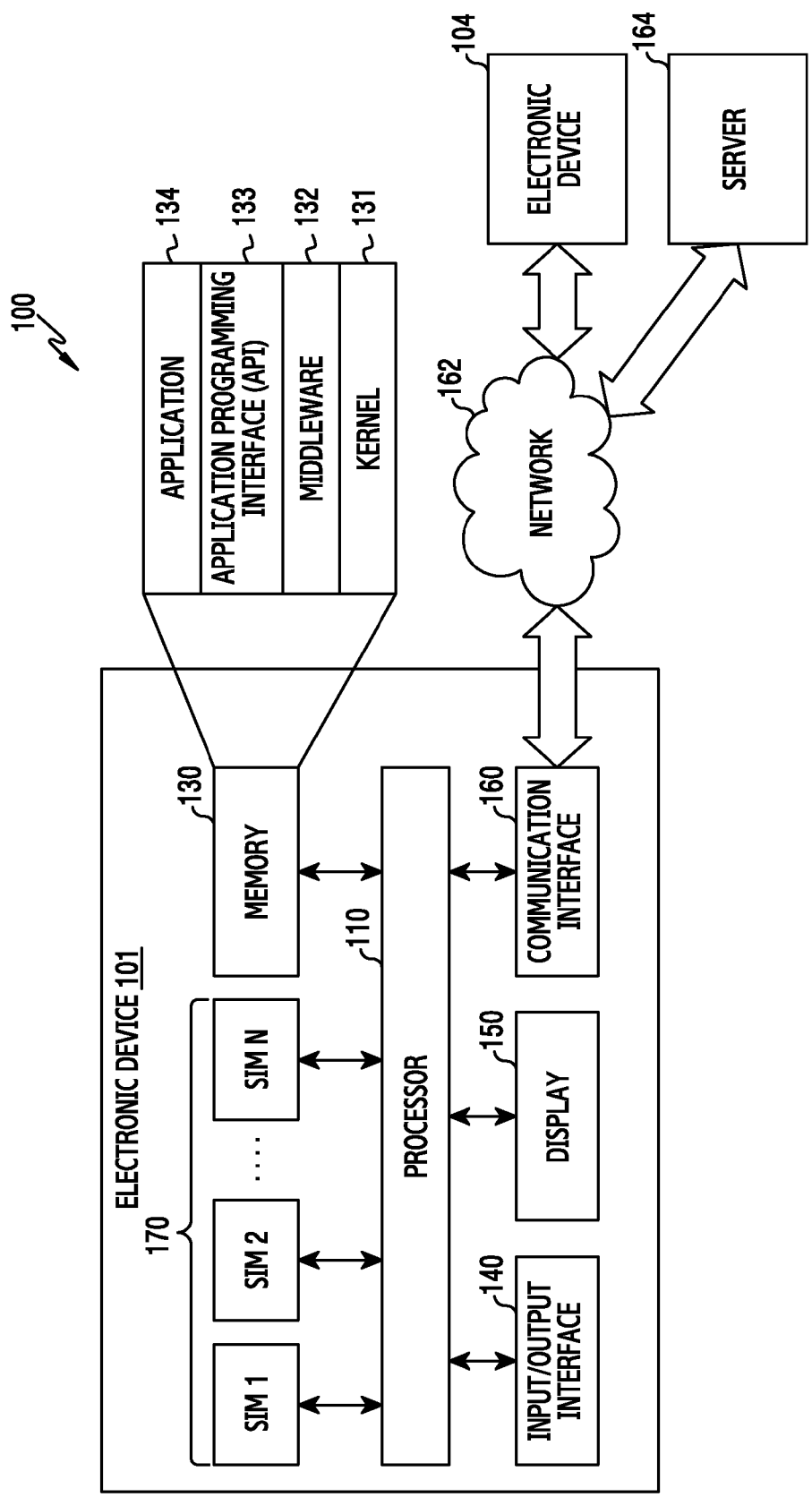
FIG. 1B is a diagram of another example of a network environment, according to various embodiments of the present disclosure.

FIG. 1B depicts another example of the network environment 100. According to this example, as illustrated in FIG. 1B, the electronic device 101 may be configured in such a structure that a plurality of SIMs 170 are connected to the processor 120. According to an embodiment, a plurality of SIMs 170 may be illustrated in such a structure that each SIM 170 is connected to the processor 120. The remaining elements are the same as those in FIG. 1A, and repeated descriptions thereof will be omitted herein.

Figure 2:
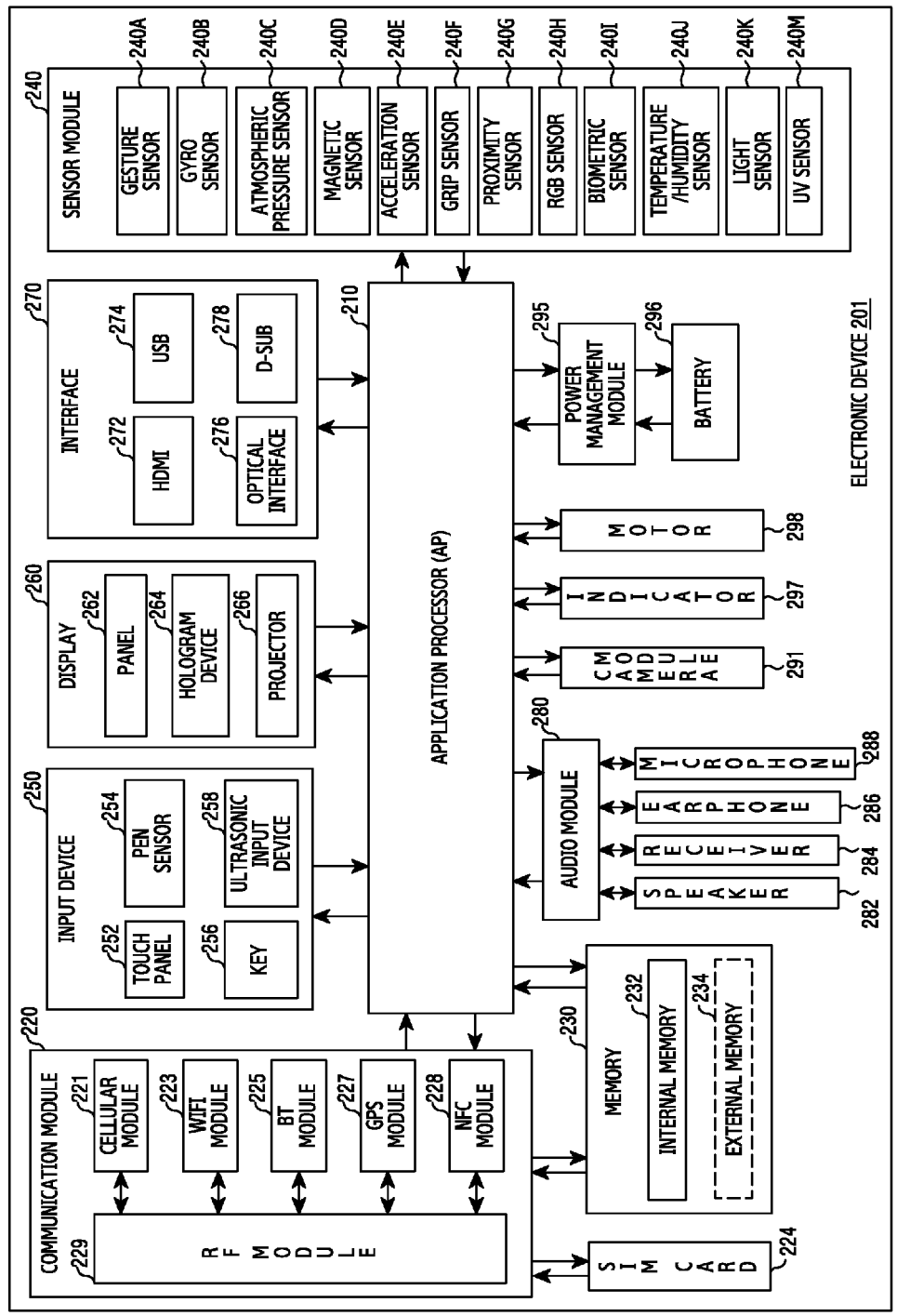
FIG. 2 is a block diagram of an example of an electronic device, according to various embodiments of the present disclosure.

FIG. 2 is a block diagram of an electronic device 201, according to various embodiments of the present disclosure. The electronic device 201 may constitute, for example, all or part of the electronic device 101 illustrated in FIG. 1A and FIG. 1B. Referring to FIG. 2, the electronic device 201 may include at least one Application Processor (AP) 210, a communication module 220, a SIM (subscriber identification module) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210 by driving an operating system or an application program and perform processing of various pieces of data including multimedia data and calculations. The AP 210 may be implemented by, for example, a System on Chip (SoC). According to an embodiment, the AP 210 may further include a graphic processing unit (GPU) (not illustrated). According to an embodiment, the application processor 120 may be configured in such a structure that it is separated into a CP (call processor) and an AP (application processor) (not illustrated). In other words, although a single application processor 120 is illustrated in FIG. 2, the application processor 120 may be configured in such a structure that it is separated into a CP (call processor) and an AP (application processor), in some cases.

The communication module 220 (e.g., the communication interface 160) may perform data transmission/reception in communication between the electronic device 201 (e.g., the electronic device 101) and other electronic devices (e.g., the electronic device 104 or the server 106) connected thereto through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide a voice call, a video call, a Short Message Service (SMS), or an Internet service through a communication network (for example, LTE, LTE-A, CDMA, WCDMA, UMTS, WiBro, or GSM). Furthermore, the cellular module 221 may distinguish between and authenticate electronic devices within a communication network by using, for example, a subscriber identification module (for example, the SIM card 224). According to one embodiment, the cellular module 221 may perform at least some functions that the AP 210 may provide. For example, the cellular module 221 may perform at least some of the multimedia control functions.

According to an embodiment, the cellular module 221 may include a communication processor (CP). Furthermore, the cellular module 221 may be implemented by, for example, an SoC. Although elements such as the cellular module 221 (e.g. communication processor), the memory 230, or the power management module 295 are illustrated in FIG. 2 as separate elements from the AP 210, the AP 210 may be implemented to include at least a part (e.g. cellular module 221) of the above-mentioned elements, according to an embodiment.

According to an embodiment, the AP 210 or the cellular module 221 (e.g. communication processor) may load a command or data received from at least one of a non-volatile memory and other elements connected thereto into a volatile memory and process the loaded command. Furthermore, the AP 210 or the cellular module 221 may store data received from or generated by at least one of other elements in a non-volatile memory.

Each of the Wi-Fi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as separate blocks in FIG. 2, at least some (for example, two or more) of the cellular module 221, the WiFi module 223, the BT module 225, the GPS module 227, and the NFC module 228 may be included in one Integrated Chip (IC) or one IC package in one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented as one SoC.

The RF module 229 may transmit/receive data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire or the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module in one embodiment.

The SIM card 224 may be a card including a subscriber identification module, and may be inserted into a slot formed in a particular portion of the electronic device. The SIM card 224 may include unique identification information (for example, an Integrated Circuit Card IDentifier (ICCID)) or subscriber information (for example, an International Mobile Subscriber IDentity (IMSI)).

The memory 230 (e.g. the memory 130) may include an internal memory 232 or an external memory 234. The internal memory 232 may include, for example, at least one of a volatile memory (e.g., a Dynamic RAM (DRAM), a Static RAM (SRAM), and a Synchronous Dynamic RAM (SDRAM)), and a non-volatile Memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory).

According to one embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected with the electronic device 201 through various interfaces. According to an embodiment, the electronic device 201 may further include a storage device (or storage medium) such as a hard drive.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illuminance sensor 240K, and a UV (ultra violet) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may recognize a touch input through at least one of, for example, a capacitive type, a resistive type, an infrared type, and an ultrasonic type. The touch panel 252 may further include a control circuit. In case of the capacitive type touch panel, physical contact or proximity recognition is possible. The touch panel 252 may further include a tactile layer. In this case, the touch panel 252 may provide a tactile reaction to the user.

The (digital) pen sensor 254 may be implemented, for example, using the same or similar method to receiving a user's touch input or using a separate recognition sheet. The key 256 may include, for example, a physical button, an optical key, or a keypad. The ultrasonic input device 258 may identify data by detecting an acoustic wave with a microphone (e.g., microphone 288) of the electronic device 201 through an input unit generating an ultrasonic signal, and may perform wireless recognition. According to an embodiment, the electronic device 201 may receive a user input from an external device (for example, computer or server) connected thereto using the communication module 220.

The display 260 (e.g. the display 150) may include a panel 262, a hologram device 264, or a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured as one module together with the touch panel 252. The hologram device 264 may show a stereoscopic image in the air using interference of light. The projector 266 may project light onto a screen to display an image. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 160 illustrated in FIG. 1A and FIG. 1B. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert a sound and an electronic signal. At least some elements of the audio module 280 may be included in, for example, the input/output interface 140 illustrated in FIG. 1. The audio module 280 may process sound information input or output through, for example, the speaker 282, the receiver 284, the earphones 286, the microphone 288 or the like.

The camera module 291 is a device that can take still and moving images, and according to an embodiment, may include one or more image sensors (e.g., a front sensor or a rear sensor, not shown), a lens (not shown), an image signal processor (ISP) (not shown), or a flash (e.g., an LED or a xenon lamp, not shown).

The power management module 295 may manage power of the electronic device 301. Although not illustrated, the power management module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from a charger. According to an embodiment, the charger IC may include a charger IC for at least one of the wired charging and the wireless charging. Examples of the wireless charging method may include a magnetic resonance type, a magnetic induction type, or an electromagnetic wave type, and an additional circuit for wireless charging, such as a coil loop circuit, a resonance circuit, or a rectifier circuit may be added.

The battery gauge may measure, for example, a remaining quantity of the battery 296, or a voltage, a current, or a temperature during the charging. The battery 296 may store or generate electricity, and may supply power to the electronic device 201 using the stored or generated electricity. The battery 296 may include, for example, a rechargeable battery or a solar battery.

The indicator 297 may display a specific status of the electronic device 301 or a part (for example the AP 210) thereof, for example, a booting status, a message status, a charging status, and the like. The motor 298 may convert an electrical signal into a mechanical vibration. Although not illustrated, the electronic device 201 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

Figure 9A:
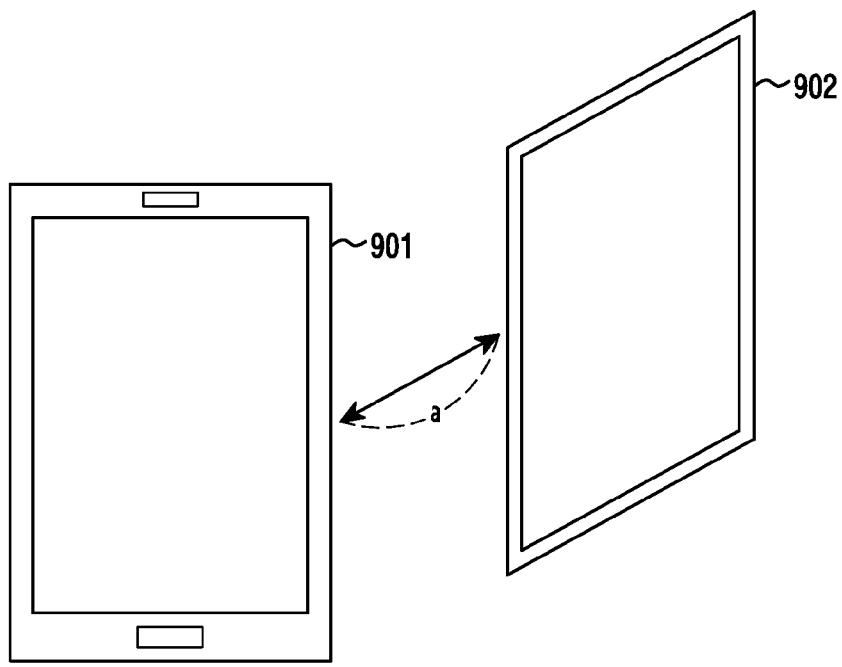
FIG. 9A and FIG. 9B are diagrams illustrating yet another example of a process for determining a SIM, according to various embodiments of the present disclosure.

According to various embodiments of the present disclosure, an electronic device having at least two SIMs may include: a processor configured to sense a reader within a preset distance and to determine one from the at least two SIMs; and a communication module configured to communicate with the reader using information stored in the determined SIM. As used throughout the disclosure, the term "reader" may refer to any suitable type of electronic device that is capable of exchanging communications with the electronic device. For example, as illustrated in FIG. 9A, both the reader may be a tablet computer or a smart phone.

According to various embodiments, the processor may be configured to determine whether one of the at least two SIMs is previously set; and to determine, when one of the at least two SIMs is previously set, the set SIM from the at least two SIMs.

According to various embodiments, the processor may be configured to determine whether one of at least one application installed in the electronic device is executed; to determine, when one of the at least one application is executed, whether one of the at least two SIMs is previously set corresponding to the executed application; and to determine, when one of the at least two SIMs is previously set corresponding to the executed application, the set SIM from the at least two SIMs.

According to various embodiments, the electronic device may further include a display configured to display a SIM selection menu including at least two SIM selection areas, and the processor may be configured to confirm that one of at least one application installed in the electronic device is executed, to receive a command for displaying the SIM selection menu while one of the at least one application, to receive a selection of one from the at least two SIM selection areas, and to determine one from the at least two SIMs corresponding to the selected area.

According to various embodiments, the electronic device may further include a display configured to display a SIM selection menu including at least two SIM selection areas, and the processor may be configured to receive a command for displaying a SIM selection menu, to receive a selection of one from the at least two SIM selection areas, and to determine one from the at least two SIMs corresponding to the selected area.

According to various embodiments, the processor may be configured to output a message for guiding the determined SIM.

According to various embodiments, the electronic device may further include a display configured to display, when a near-field communication module is enabled, a SIM selection window, which is divided into at least two areas, and the processor may be configured to receive a selection of one from the at least two areas, and to determine one from the at least two SIMs corresponding to the selected area.

According to various embodiments, the electronic device may further include a display configured to display a SIM selection window, which is divided into at least two areas, and the processor may be configured to receive a selection of one from the at least two areas, and to determine one from the at least two SIMs corresponding to the selected area.

According to various embodiments, the processor may be configured to determine whether a power supply is turned off, and to determine, when the power supply is turned off, one previously set from the at least two SIMs.

According to various embodiments, the processor may be configured to receive a command for turning off a power supply, and to output a message for guiding the determined SIM.

Figure 3:
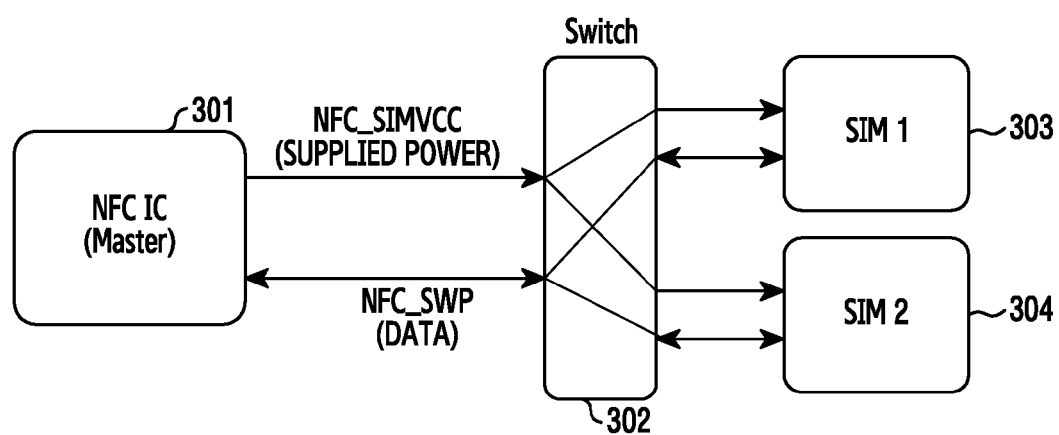
FIG. 3 illustrates is a block diagram of an example of an electronic device, according to various embodiments of the present disclosure.

FIG. 3 is a block diagram of an example of an electronic device, according to various embodiments of the present disclosure. As illustrated in FIG. 3, the electronic device according to various embodiments of the present disclosure may include an NFC IC (near-field communication integrated circuit) 301, a switch 302, and at least two SIMs 303 and 304. It will be assumed in the description of the present embodiment that the electronic device has two SIMs, but in other implementations the electronic device may include any suitable number of SIMs, i.e. at least three SIMs.

The NFC IC 301 may be connected to the switch 302 and may supply power to the SIMs 303 and 304 and receive data transmitted from the dual SIMs 303 and 304. According to an embodiment, the NFC IC 301 may supply power to the SIMs 303 and 304 through a power line, such as NFC_SIMVCC. According to an embodiment, the NFC IC 301 may receive data, which is stored in each of the dual SIMs 303 and 304, from the SIMs 303 and 304 through a data line, such as NFC_SWP.

According to various embodiments, the NFC IC 301 may be driven when the electronic device is powered off, and the NFC IC 301 may supply power to a SIM that has been set, through the switch 302, and receive data transmitted from the SIM that has been set. According to an embodiment, the electronic device may supply power to one SIM, which has been set among the dual SIMs 303 and 304, even when the electronic device is powered off, and receive data transmitted from the one SIM.

According to an embodiment, when the electronic device is powered off, the NFC IC 301 may supply power to a first SIM 303, which has been set among the dual SIMs 303 and 304, through a power line, such as NFC_SIMVCC. According to an embodiment, when the electronic device is powered off, the NFC IC 301 may receive data from a second SIM 304, which has been set among the dual SIMs 303 and 304, through a data line, such as NFC_SWP.

The switch 302 may receive power supplied from the NFC IC 301 and supply power to a connected SIM among the SIMs 303 and 304. According to an embodiment, when it is the first SIM 303 that is connected to the NFC IC 301 by the switch 302 among the SIMs 303 and 304, the switch 302 may supply power, which has been supplied from the NFC IC 301 through a power line such as NFC_SIMVCC, to the first SIM 303.

According to various embodiments, the switch 302 may forward data, which has been transmitted from a connected SIM among the SIMs 303 and 304, to the NFC IC 301. According to an embodiment, when it is the second SIM 304 that is connected to the NFC IC 301 by the switch 302 among the dual SIMs 303 and 304, the switch 302 may forward data from the second SIM 304, to the NFC IC 301 through a data line such as NFC_SWP.

According to various embodiments, the switch 302 may disconnect the NFC IC 301 from one of the SIMs 303 and 304, and connect the NFC IC 301 to the other SIM. According to an embodiment, the switch 302 may disconnect the NFC IC 301 from the first SIM 303, and connect the NFC 301 to the second SIM 304. According to an embodiment, the switch 302 may disconnect the NFC IC 301 from the second SIM 304 and connect the NFC IC 301 to the first SIM 303.

The SIMs 303 and 304 may be connected to the NFC IC 301 by the switch 302 to receive power from the NFC IC 301 and may supply data, which is stored in the dual 303 and 304, to the NFC IC 301. An example will now be described in which the user's personal information is stored in the first SIM 303, and the user's payment information is stored in the second SIM 302. In the above-mentioned example, when the first SIM 303 is connected to the NFC IC 301 through the switch 302, the first SIM 303 may, when performing near-field communication with a reader, transmit the user's personal information, which is stored in the first SIM 303, to the NFC IC 301 through the switch 302. In the above-mentioned example, when the second SIM 304 is connected to the NFC IC 301 through the switch 302, the second SIM 304 may, when performing near-field communication with a reader, transmit the user's payment information, which is stored in the second SIM 304, to the NFC IC 301 through the switch 302.

Figure 4:
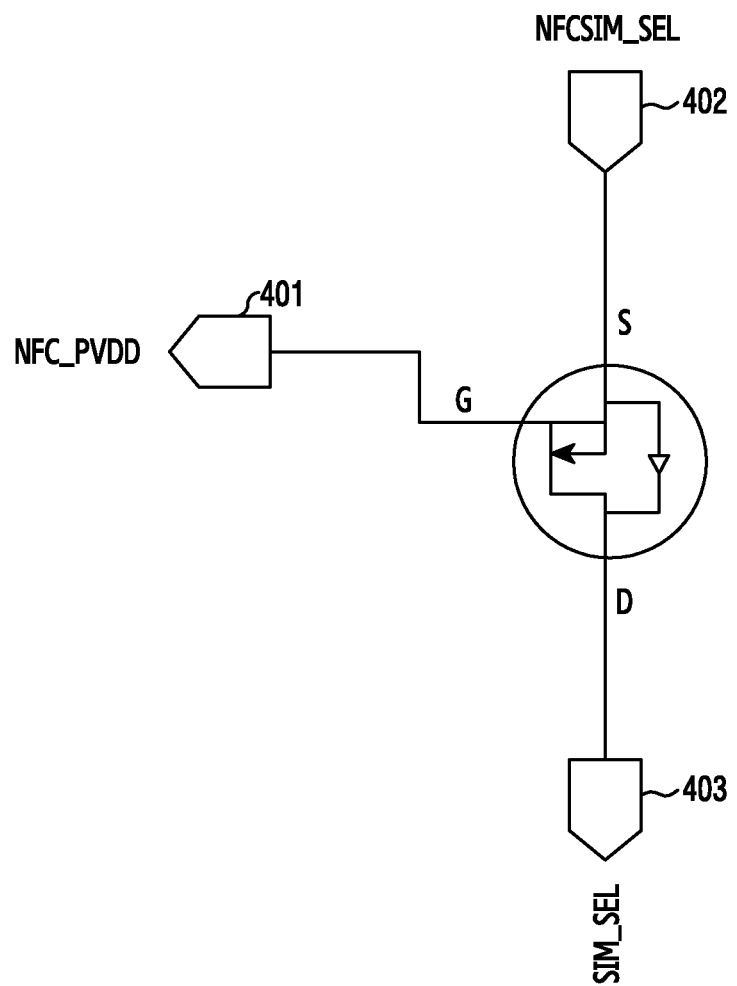
FIG. 4 is a diagram of an example of a switch, according to various embodiments of the present disclosure.

FIG. 4 is a diagram of an example of a switch, according to various embodiments of the present disclosure. As illustrated in FIG. 4, a switch according to various embodiments of the present disclosure may be any device that operates as a switch. For example, in the present embodiment, operations of a switch, which is driven using a MOSFET (metal-oxide semiconductor field effect transistor) and a SPDT (single pole double throw) device, will be described. Furthermore, a case will be described wherein the electronic device is provided with a first SIM, which is a main SIM, and a second SIM, which is a sub SIM.

The NFC_PVDD 401 can supply power to the MOSFET only when the electronic device is powered on. According to various embodiments, the NFC_PVDD 401 may supply 1.8V to the MOSFET when the electronic device is powered on and, when the electronic device is powered off, the NFC_PVDD 401 may not supply any power to the MOSFET. According to an embodiment, when the electronic device is powered on, the NFC_PVDD 401 may supply 1.8V to the gate line of the MOSFET.

According to various embodiments, the NFCSIM_SEL 402 may supply power to the MOSFET or may not supply any power to the MOSFET. According to an embodiment, the NFCSIM_SEL 402 may supply 1.8V to the source line of the MOSFET or may not supply any power to the source line of the MOSFET.

According to various embodiments, the NFCSIM_SEL 402 may supply 1.8V to the source line of the MOSFET when the electronic device is powered on. According to an embodiment, when the electronic device is powered on, the NFC_PVDD 401 may supply 1.8V to the gate line of the MOSFET, and the NFCSIM_SEL 402 may not supply power to the source line of the MOSFET. According to an embodiment, when the electronic device is powered on, the voltage difference (VGS) between the gate and the source of the MOSFET may be 1.8V. According to an embodiment, when the electronic device is powered on, the voltage difference between the gate and the source of the MOSFET may be 1.8V because the NFC_PVDD 401 may supply 1.8V to the gate line of the MOSFET, and the NFCSIM_SEL 402 may not supply any power to the source line of the MOSFET.

According to various embodiments, when the voltage difference between the gate and the source of the MOSFET is 1.8V, the voltage of the SIM_SEL 403 may be 0V. According to an embodiment, when the voltage difference between the gate and the source of the MOSFET is 1.8V, the out voltage of the drain line of the MOSFET may be 0V. According to an embodiment, when the voltage of the drain of the MOSFET is 0V, the switch may be connected to the second SIM, which is a sub SIM.

According to various embodiments, the NFCSIM_SEL 402 may not supply power to the source line of the MOSFET when the electronic device is powered off. According to an embodiment, when the electronic device is powered off, the NFC_PVDD 401 may not supply power to the gate line of the MOSFET, and the NFCSIM_SEL 402 may supply 1.8V to the source line of the MOSFET. According to an embodiment, when the electronic device is powered off, the voltage difference (VGS) between the gate and the source of the MOSFET may be 0V. According to an embodiment, when the electronic device is powered off, the voltage difference between the gate and the source of the MOSFET may be 0V because the NFC_PVDD 401 may not supply power to the gate line of the MOSFET, and the NFCSIM_SEL 402 may supply power of 1.8V to the source line of the MOSFET.

According to various embodiments, when the voltage difference between the gate and the source of the MOSFET is 0V, the voltage of the SIM_SEL 403 may be 1.8V. According to an embodiment, when the voltage difference between the gate and the source of the MOSFET is 0V, the output voltage of the drain of the MOSFET may be 1.8V. According to an embodiment, when the voltage of the drain of the MOSFET is 1.8V, the switch may be connected to the first SIM, which is a main SIM.

Figure 5A:
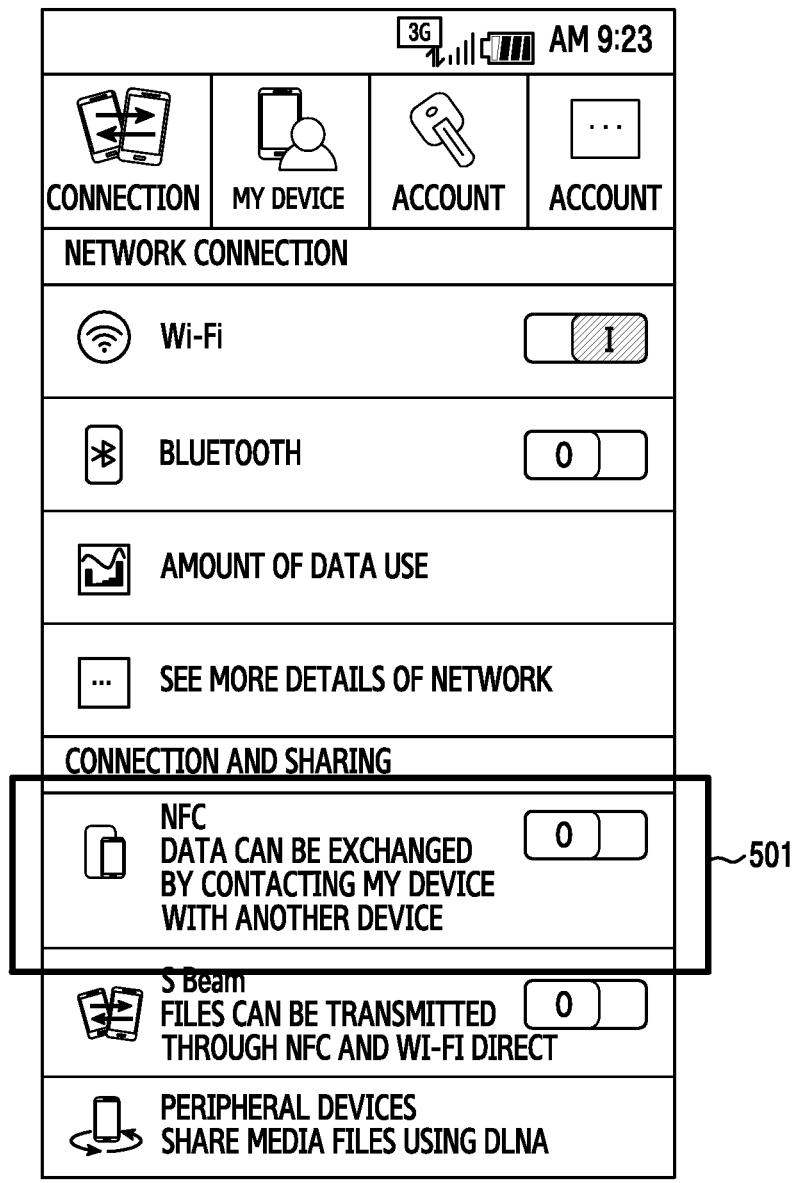
FIG. 5A, FIG. 5B, and FIG. 5C are diagrams illustrating an example of a process for determining a SIM, according to various embodiments of the present disclosure.
Figure 5B:
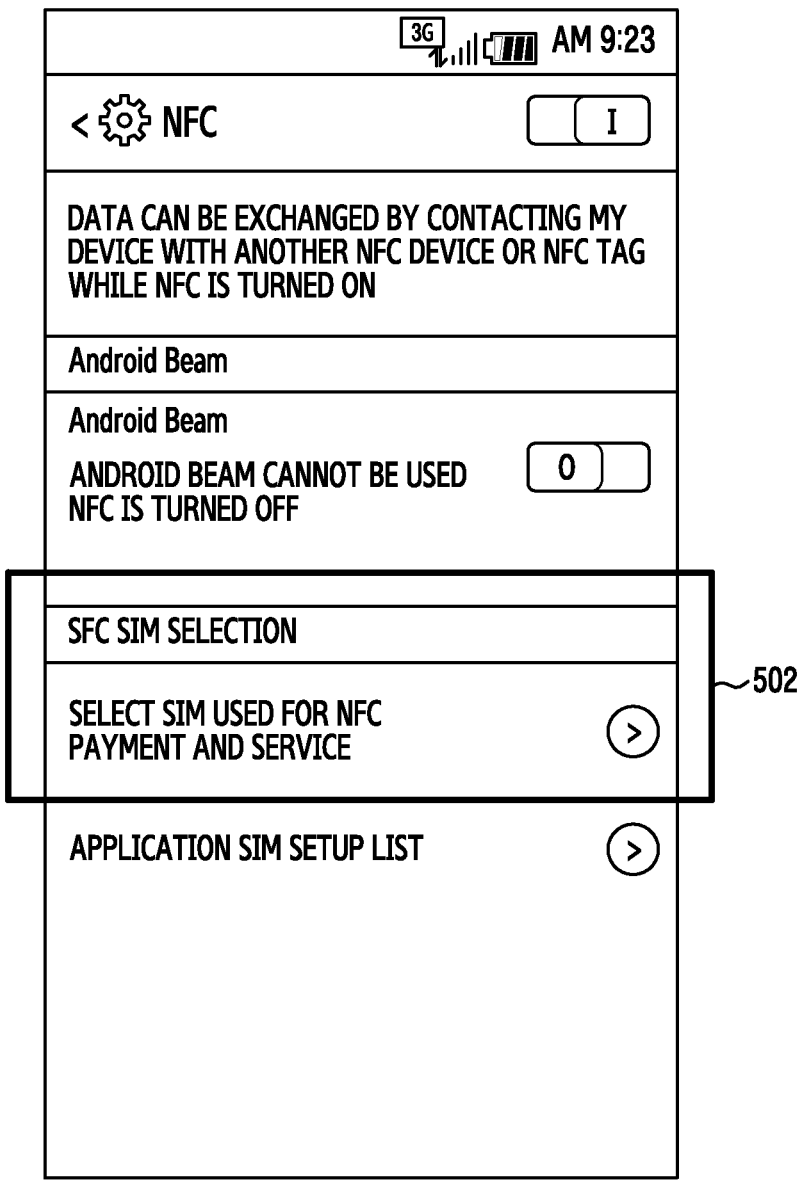
Figure 5C:
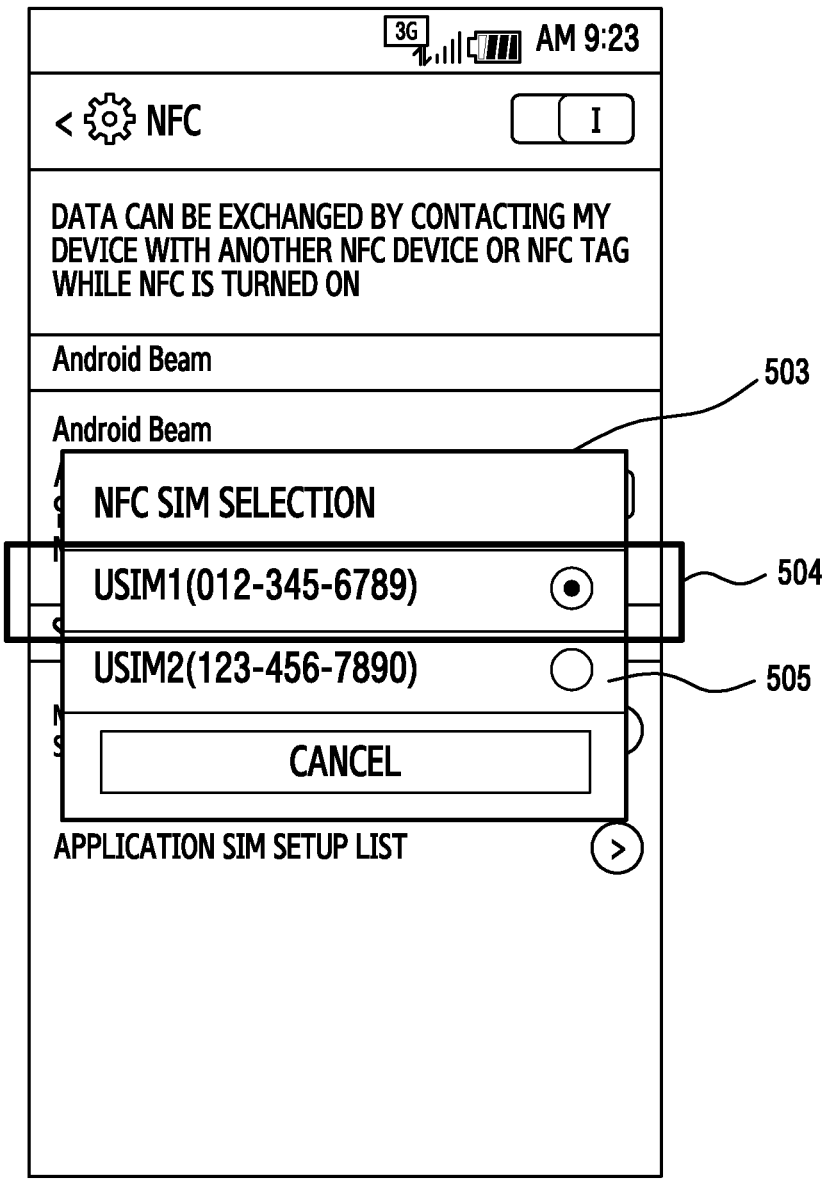

FIG. 5A to FIG. 5C illustrate an example of a process for selecting a SIM for communication with a reader, according to various embodiments of the present disclosure. According to various embodiments, an electronic device may receive an input of a command that instructs display of a SIM selection menu, in order to receive selection of a SIM, which is to perform communication with another electronic device and a reader. The SIM may be determined from at least two SIMs provided in the electronic device. According to an embodiment, as illustrated in FIG. 5A, the electronic device may receive an input of an area 501, which is used to perform near-field communication, from a menu screen and thereby receive an input of a command that enables near-field communication with a reader.

According to various embodiments, the electronic device may receive an input of a command that instructs display of a SIM selection menu, in order to receive selection of a SIM, which is to be used for near-field communication, from a plurality of SIMs provided in the electronic device. According to an embodiment, as illustrated in FIG. 5B, the electronic device may receive selection of an area, such as area "Select SIM used for NFC payment and service", in order to display a SIM selection menu.

According to various embodiments, the electronic device may receive selection of a SIM, which is to perform communication with a reader, from a plurality of SIMs provided in the electronic device. According to an embodiment, the electronic device may receive selection of an area from at least two SIM selection areas included in a SIM selection menu and choose a SIM, which corresponds to the selected area, as a SIM that is to perform communication with another a reader. According to an embodiment, as illustrated in FIG. 5C, the electronic device may display a SIM selection menu 503, such as menu "Select NFC SIM", on the display of the electronic device.

For example, the electronic device may have a first SIM, to which the telephone number "012-345-6789" is assigned, a second SIM, to which the telephone number "123-456-7890" is assigned, and the like. In the above-mentioned example, the electronic device may include, in the SIM selection menu 503, an area 504 associated with the first SIM, an area 505 associated with the second SIM, and the like. According to an embodiment, the electronic device may detect a selection of the area 504 and choose the first SIM perform communication with a reader.

Figure 6A:
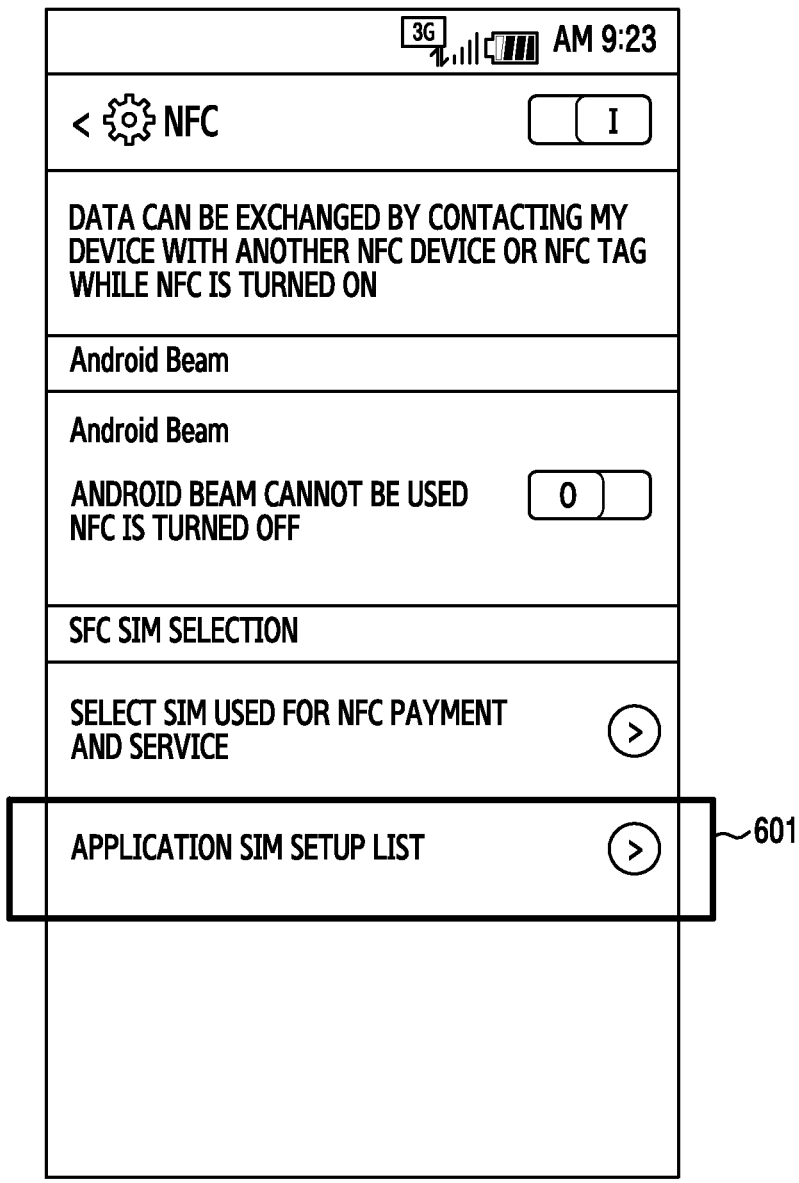
FIG. 6A, FIG. 6B, and FIG. 6C are diagrams illustrating another example of a process for determining a SIM, according to various embodiments of the present disclosure.
Figure 6B:
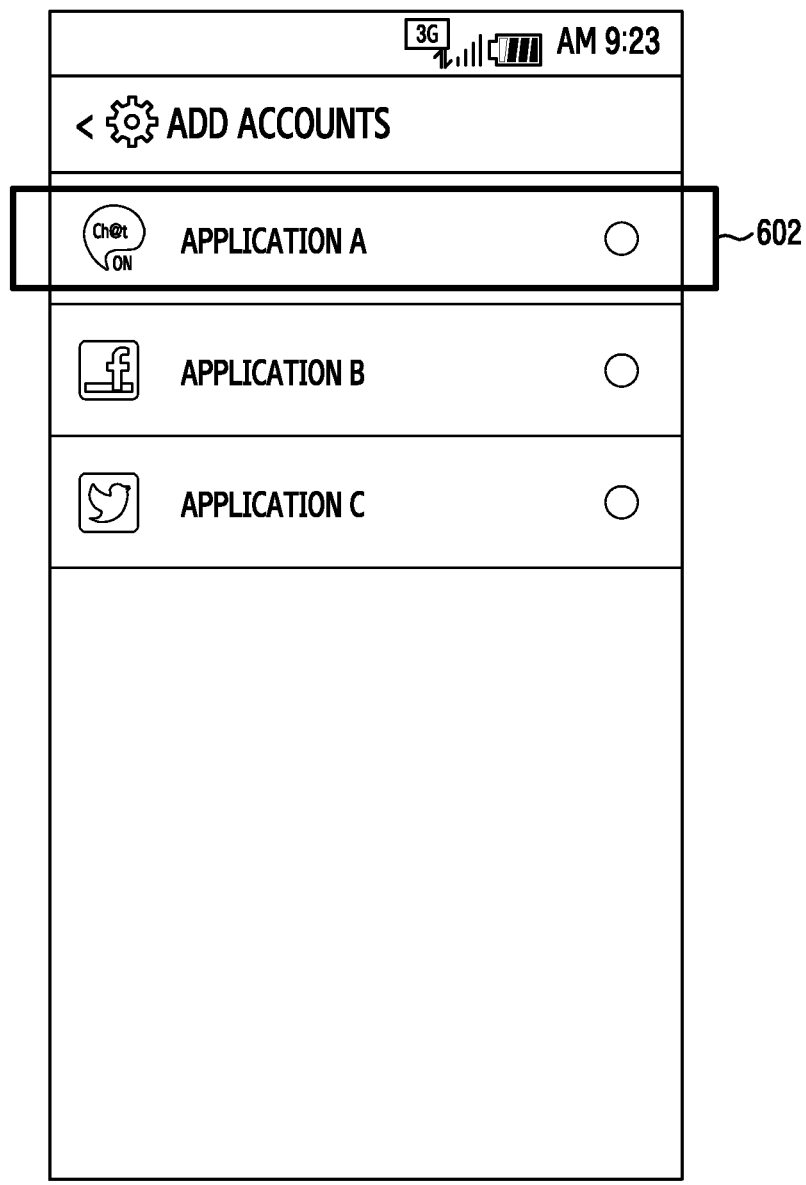
Figure 6C:
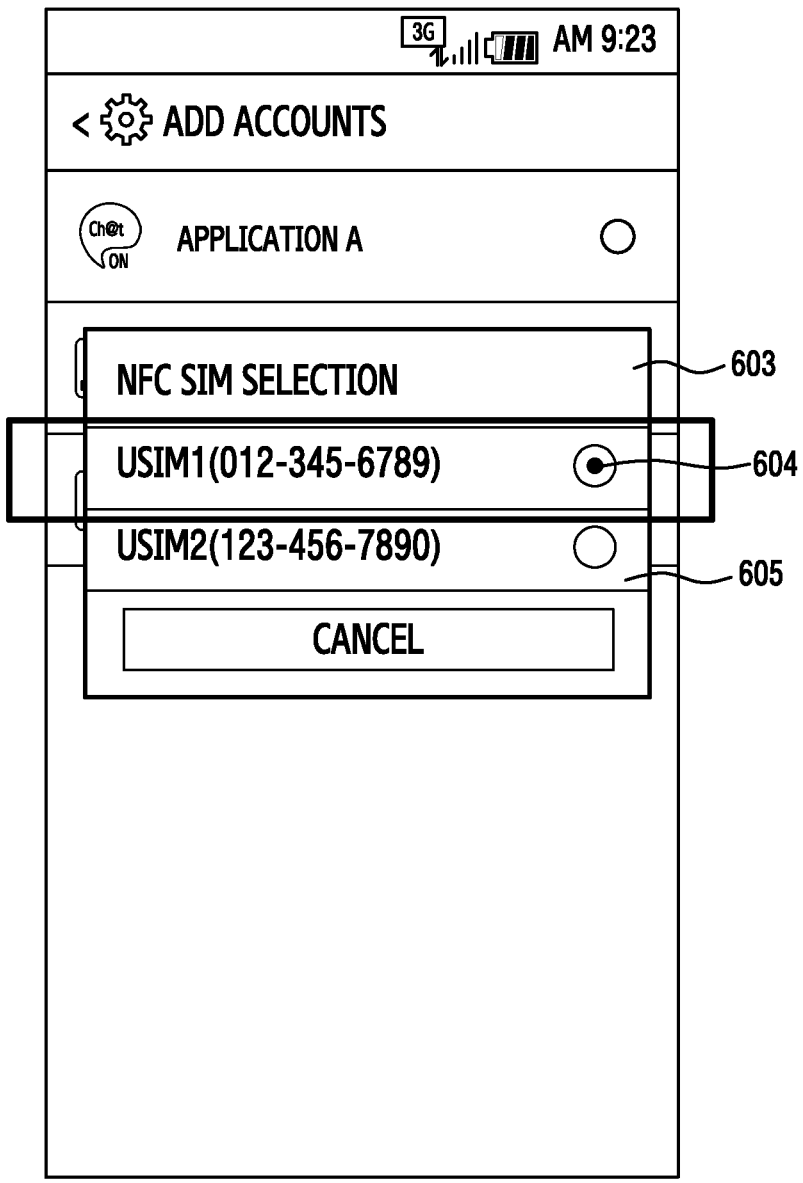

FIG. 6A to FIG. 6C illustrate an example of a process for determining a SIM for communication with a reader, according to various embodiments of the present disclosure. According to various embodiments, an electronic device may receive selection of one of a plurality of SIMs provided in the electronic device such that the selected SIM performs communication with another electronic device and a reader when a specific application among a plurality of applications installed in the electronic device is executed.

According to various embodiments, the electronic device may receive an input of a command that instructs display of a SIM selection menu, in order to receive selection of a SIM, which is to perform communication with another electronic device and a reader, from at least two SIMs provided in the electronic device, when a specific application is executed. According to an embodiment, as illustrated in FIG. 6A, the electronic device may receive selection of an area 601, such as area "Application SIM setup list", such that one of the plurality of SIMs provided in the electronic device can be connected to an NFC interface (e.g., NFC IC 301), when a specific application is executed.

According to various embodiments, the electronic device may receive selection of one application from a plurality of applications installed in the electronic device. According to an embodiment, the electronic device may display a plurality of applications installed in the electronic device, in order to receive selection of one application from the plurality of applications installed in the electronic device. According to an embodiment, as illustrated in FIG. 6B, the electronic device may display a plurality of applications installed in the electronic device, i.e. "application A", "application B", "application C", and the like on the display of the electronic device. According to an embodiment, the electronic device may receive selection of one application from a plurality of applications displayed on the display of the electronic device. According to an embodiment, as illustrated in FIG. 6B, the electronic device may receive selection of an "application A" area 602 from application areas displayed on the display of the electronic device.

According to various embodiments, the electronic device may receive selection of a SIM, which is to become associated with an application that is chosen from the menu shown in FIG. 6B. When that application is executed, a switch (e.g., switch 302) may be configured to connect the selected SIM to a communications interface (e.g., NFC IC 301). The selected SIM may then be used to perform communication with a reader. According to an embodiment, the electronic device may receive selection of an area from at least two SIM selection areas included in a SIM selection menu and choose a SIM, which corresponds to the selected area, as a SIM that is to perform communication with a reader. According to an embodiment, as illustrated in FIG. 6C, the electronic device may display a SIM selection menu 603, such as the menu "Select NFC SIM", on the display of the electronic device.

For example, the electronic device may have a first SIM, to which the telephone number "012-345-6789" is assigned, a second SIM, to which the telephone number "123-456-7890" is assigned, and the like. In the above-mentioned example, the electronic device may include, in the SIM selection menu 603, an area 604, which can be used to select the first SIM, an area 605, which can be used to select the second SIM, and the like. According to an embodiment, the electronic device may receive selection of the area 604, which can be used to select the first SIM, from the SIM selection menu 603. According to an embodiment, the electronic device may choose the selected first SIM as a SIM to perform communication with another a reader, when a specific application is executed. According to an embodiment, the electronic device may choose the selected first SIM as a SIM to perform communication with another a reader, when "application A" is executed.

Figure 7A:
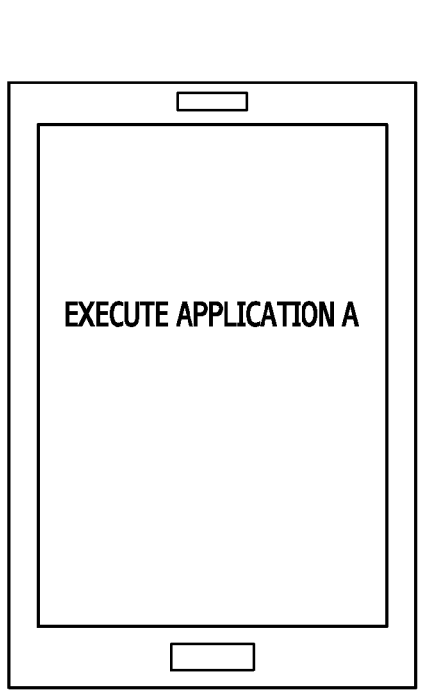
FIG. 7A, FIG. 7B, FIG. 7C, and FIG. 7D are diagrams illustrating yet another example of a process for determining a SIM, according to various embodiments of the present disclosure.

FIG. 7A to FIG. 7D illustrate an example of a process for determining a SIM for communication with a reader, according to various embodiments of the present disclosure. According to various embodiments, an electronic device may detect that a specific application is executed. According to an embodiment, as illustrated in FIG. 7A, the electronic device may confirm that "application A" among a plurality of applications that have been set is being executed.

Figure 7B:
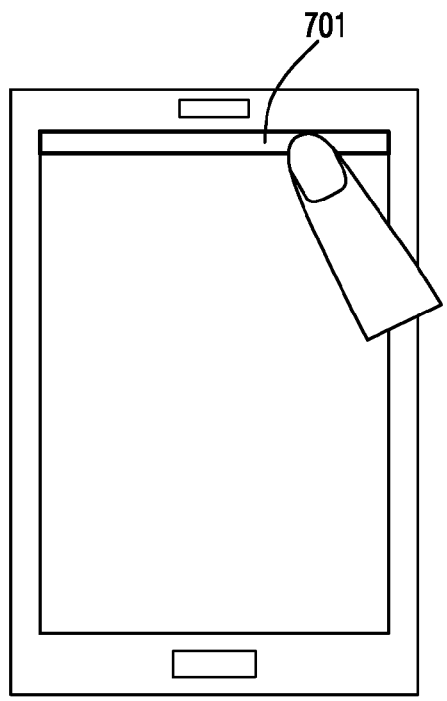

According to various embodiments, the electronic device may receive an input of a command that instructs display of a SIM selection menu while a specific application is being executed. According to an embodiment, as illustrated in FIG. 7B, the electronic device may detect a selection of an indicator area 701 of the electronic device while "application A" is being executed.

Figure 7C:
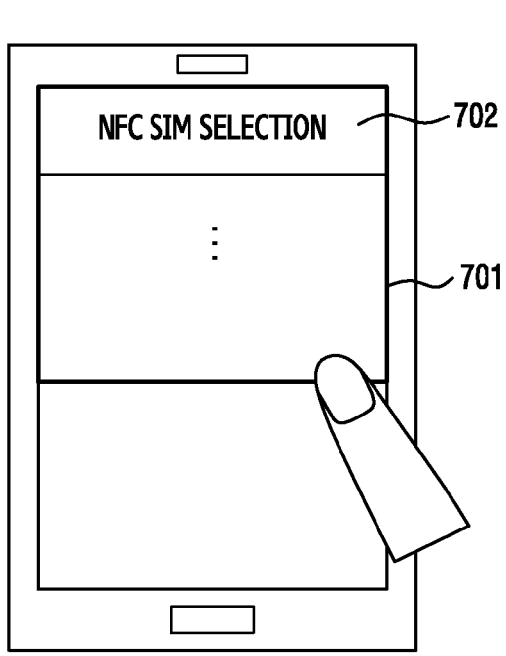

According to various embodiments, the electronic device may receive selection of a SIM, which is to perform communication with a reader, from a plurality of SIMs provided in the electronic device. According to an embodiment, the electronic device may receive selection of an area from at least two SIM selection areas included in a SIM selection menu inside the indicator area 701 and choose a SIM, which corresponds to the selected area, as a SIM that is to perform communication with a reader. According to an embodiment, as illustrated in FIG. 7C, the electronic device may display a SIM selection menu 702, such as menu "Select NFC SIM", on the display of the electronic device.

Figure 7D:
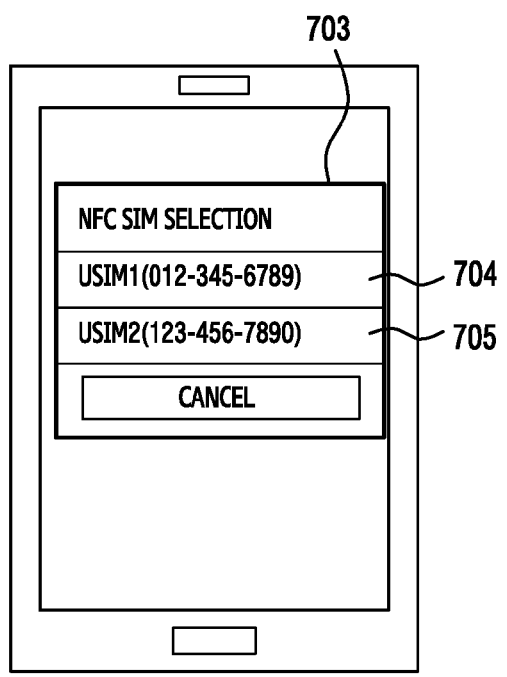

According to various embodiments, the electronic device may receive selection of a SIM, which is to perform communication with a reader, from a plurality of SIMs provided in the electronic device. According to an embodiment, the electronic device may receive selection of an area from at least two SIM selection areas included in a SIM selection menu and choose a SIM, which corresponds to the selected area, as a SIM that is to perform communication with a reader. According to an embodiment, as illustrated in FIG. 7D, the electronic device may display a SIM selection menu 703, such as the menu "Select NFC SIM", on the display of the electronic device.

For example, the electronic device has a first SIM, to which the telephone number "012-345-6789" is assigned, a second SIM, to which the telephone number "123-456-7890" is assigned, and the like. In the above-mentioned example, the electronic device may include, in the SIM selection menu 703, an area 704, which can be used to select the first SIM, an area 705, which can be used to select second SIM, and the like. According to an embodiment, the electronic device may receive selection of the first SIM or the second SIM from the SIM selection menu 703. According to an embodiment, the electronic device may choose one selected SIM as a SIM to perform communication with a reader, when a specific application is executed. According to an embodiment, the electronic device may choose the selected SIM as a SIM to perform communication with a reader, when "application A" is executed. In other words, in this example, the selected SIM is associated with "application A" by virtue of the electronic device receiving an instruction to display the menu 703 while "application A" is executed (and/or the interface of "application A" is displayed on the screen of the device). Under this approach, no menu for application selection, such as the menu of FIG. 6B, is necessary.

Figure 8B:
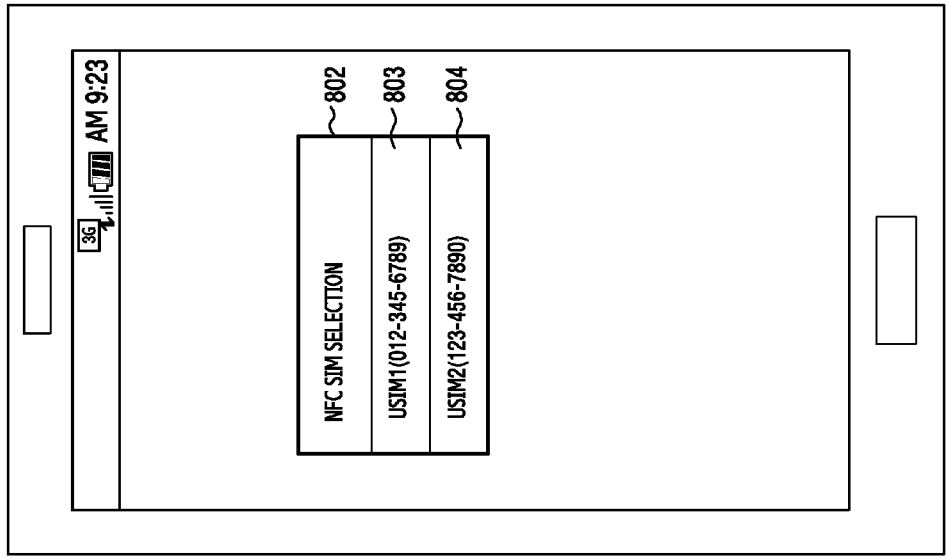
FIG. 8A and FIG. 8B are diagrams illustrating yet another example of a process for determining a SIM, according to various embodiments of the present disclosure.
Figure 8A:
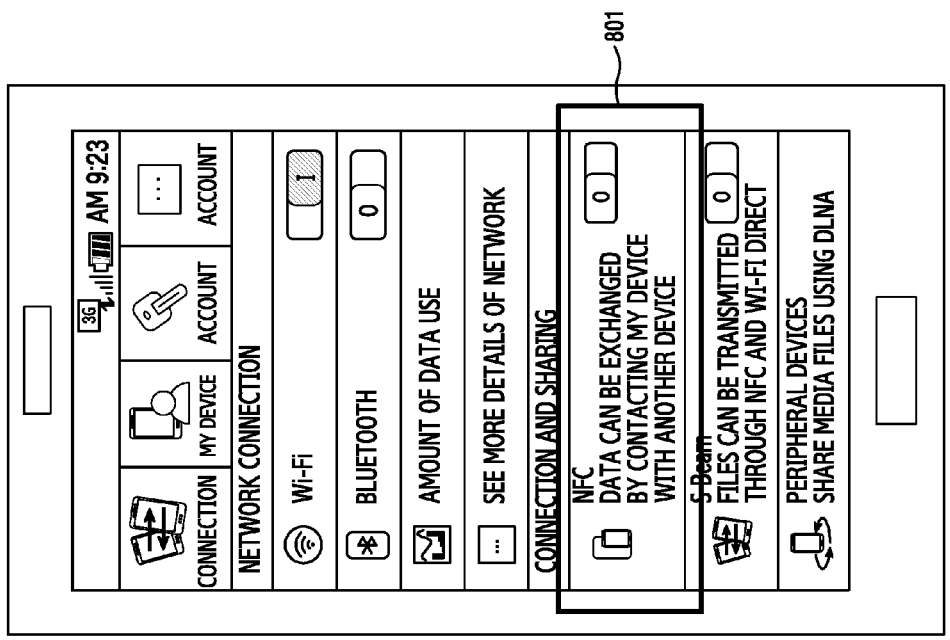

FIG. 8A and FIG. 8B illustrate an example of a process for determining a SIM for communication with a reader, from a plurality of SIMs provided in an electronic device according to various embodiments of the present disclosure. According to various embodiments, when the electronic device receives an instruction to transfer data via NFC, the electronic device may receive selection of one SIM, which is to perform communication with another electronic device and a reader, from a plurality of SIMs provided in the electronic device.

According to an embodiment, as illustrated in FIG. 8A, the electronic device may receive an input of a command that instructs execution of an NFC module from the menu screen. According to an embodiment, the electronic device may receive selection of an area 801, which is used to enable the NFC module, from the menu screen of the electronic device.

According to various embodiments, the electronic device may receive selection of a SIM from a plurality of SIMs provided in the electronic device. According to an embodiment, the electronic device may receive selection of an area from at least two SIM selection areas included in a SIM selection menu and choose a SIM, which corresponds to the selected area, as a SIM that is to perform communication with a reader. As illustrated in FIG. 8B, the electronic device may display a SIM selection menu 802, such as menu "Select NFC SIM", on the display of the electronic device.

For example, wherein the electronic device has a first SIM, to which the telephone number "012-345-6789" is assigned, a second SIM, to which the telephone number "123-456-7890" is assigned, and the like. In the above-mentioned example, the electronic device may include, in the SIM selection menu 802, an area 804, which can be used to select the first SIM, an area 803, which can be used to select the second SIM, and the like. According to an embodiment, the electronic device may receive selection of one SIM from the SIM selection menu 802. According to an embodiment, the electronic device may choose the selected SIM as a SIM to perform communication with a reader.

Figure 9B:
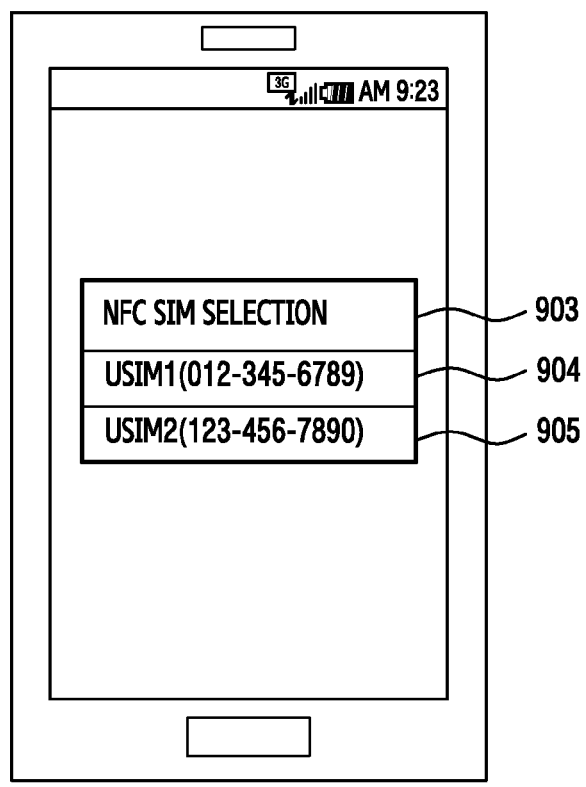

FIG. 9A and FIG. 9B illustrate an example of a process for determining a SIM for communication with a reader, according to various embodiments of the present disclosure. According to various embodiments, an electronic device may determine whether a reader is positioned within a preset distance or not. According to an embodiment, as illustrated in FIG. 9A, the electronic device 901 may sense that a reader 902 is positioned within a preset distance a.

According to various embodiments, the electronic device may receive selection of a SIM, which is to perform communication with the reader, from a plurality of SIMs provided in the electronic device. According to an embodiment, as illustrated in FIG. 9B, the electronic device may display a SIM selection menu 903, such as menu "Select NFC SIM", on the display of the electronic device.

For example, the electronic device has a first SIM, to which the telephone number "012-345-6789" is assigned, a second SIM, to which the telephone number "123-456-7890" is assigned, and the like. In the above-mentioned example, the electronic device may include, in the SIM selection menu 903, an area 904, which can be used to select the first SIM, an area 905, which can be used to select the second SIM, and the like. According to an embodiment, the electronic device may receive selection of one SIM from the SIM selection menu 903 and determine the selected SIM as a SIM to perform communication with a reader.

Figure 10:
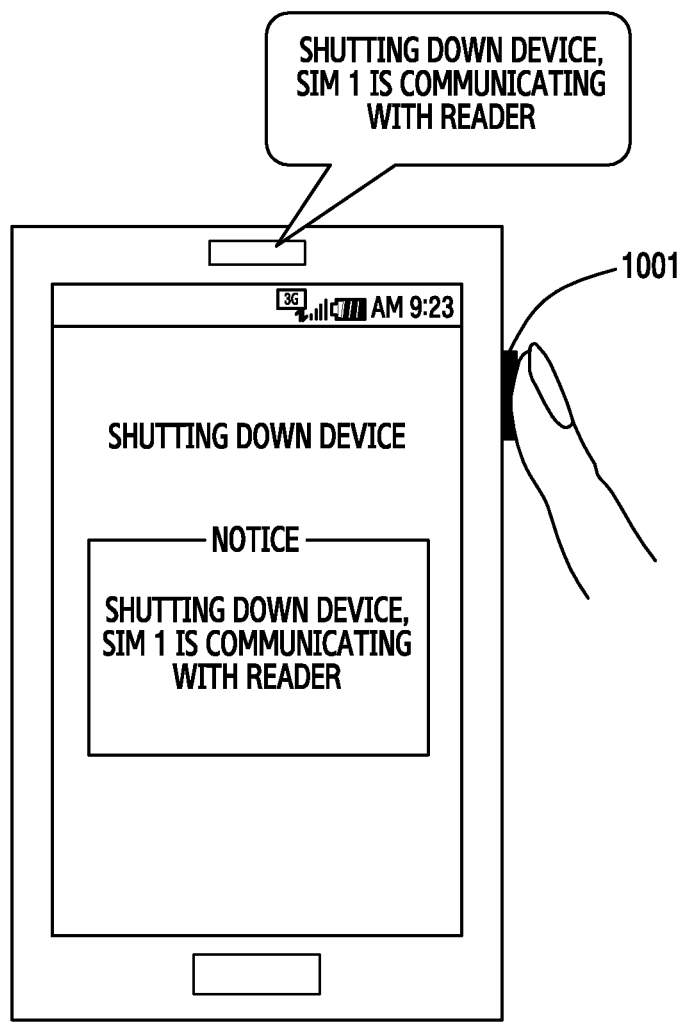
FIG. 10 is a diagram illustrating the operation of an electronic device, according to various embodiments of the present disclosure.

FIG. 10 is a diagram illustrating the operation of an electronic device, according to various embodiments of the present disclosure.

According to various embodiments, when the electronic device is powered off, the electronic device may display a message guiding that a SIM, which has been selected in advance from at least two SIMs provided in the electronic device, is set as a SIM to perform communication with a reader. According to an embodiment, when the electronic device receives selection of an area 1001, which has been set to end power supply to the electronic device, the electronic device may display a message such as "Shutting Down Device, SIM 1 is Communicating with Reader" on the display of the electronic device.

According to various embodiments, when the electronic device is powered off, the electronic device may output, an audible message indicating that a SIM, which has been selected in advance from a plurality of SIMs provided in the electronic device, is set as a SIM to perform communication with a reader. According to an embodiment, when the electronic device receives selection of an area 1001, which has been set to end power supply to the electronic device, the electronic device may output a voice message such as "Ending the device, SIM 1 performs communication with the reader" through the speaker of the electronic device.

Figure 11:
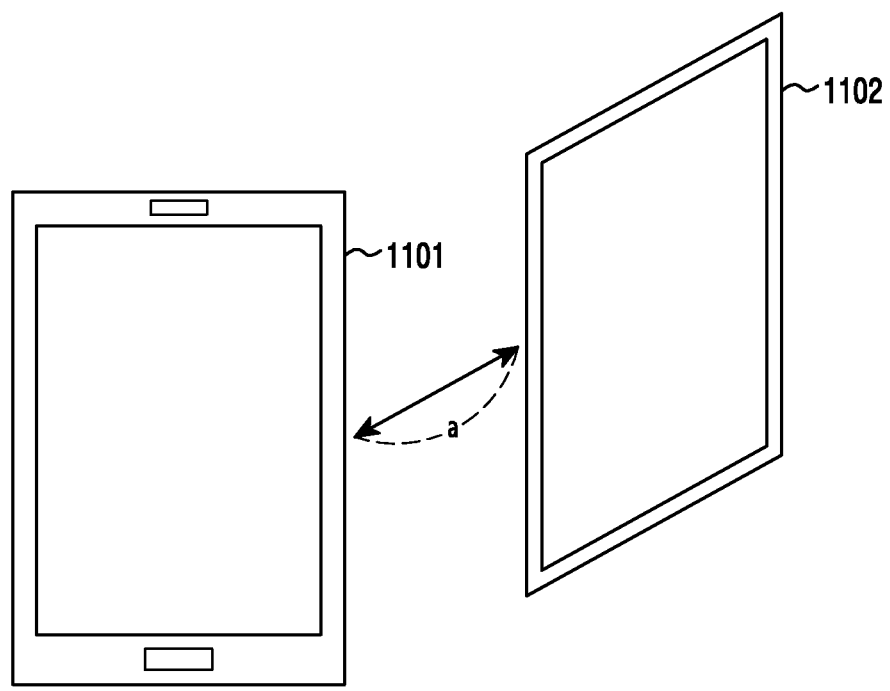
FIG. 11 is a diagram illustrating the operation of an electronic device, according to various embodiments of the present disclosure.

FIG. 11 is a diagram illustrating an example of the operation of an electronic device, according to various embodiments of the present disclosure. FIG. 11 illustrates a seventh embodiment for determining a SIM, which is to perform communication with a reader. For example, an electronic device 1101 and a reader 1102 may be positioned within a preset distance a and perform near-field communication with each other.

According to various embodiments, the electronic device 1101 may have a business-related SIM and a personal SIM separate from each other. According to an embodiment, the electronic device 1101 may perform near-field communication with a reader 1102 using a SIM, which has been set for business purposes, when entering/exiting the company and when using the company cafeteria, while a specific application is being executed. According to an embodiment, when a personal spending is paid for, for example, the electronic device 1101 can perform near-field communication with a reader 1102 using a SIM, which has been set for personal purposes, while a specific application is being executed.

According to various embodiments, when the electronic device 1101 is provided with SIMs for different communication companies, the electronic device 1101 may execute an application optimized to each communication company. According to an embodiment, a case will be described wherein the electronic device 1101 has three SIMs, including "SIM A" for "communication company A", "SIM B" for "communication company B", and "SIM C" for "communication company C".

According to an embodiment, when the electronic device 1101 perform near-field communication with a reader 1102, and when it is "application A" that is optimized for "communication company A", the electronic device may retrieve information stored in "SIM A" among the provided SIMs and perform near-field communication with the reader 1102.

According to an embodiment, when the electronic device 1101 performs near-field communication with a reader 1102, and when it is "application B" that is optimized for "communication company B", the electronic device may retrieve information stored in "SIM B" among the provided SIMs and perform near-field communication with the reader 1102.

According to an embodiment, when the electronic device 1101 performs near-field communication with a reader 1102, and when it is "application C" that is optimized for "communication company C", the electronic device may retrieve information stored in "SIM C" among the provided SIMs and perform near-field communication with the reader 1102.

According to various embodiments, when the electronic device 1101 has both a SIM of the user's parent and a SIM of the user himself/herself, who is a student, the user, who still lacks economic capability, may use the parent's SIM when utilizing a payment service and may use the user's own SIM when utilizing a student authentication procedure service. According to an embodiment, a case will be described wherein the SIM of the user's parent is the first SIM, and the user's own SIM is the second SIM.

In the above-mentioned example, the electronic device 1101 may select the first SIM from the provided SIMs, when using a payment service, and use the payment service through near-field communication with a reader 1102. According to an embodiment, the electronic device 1101 may select the second SIM from the SIMs provided in the electronic device, when using a student authentication procedure service, for example, and perform near-field communication with the reader 1102.

Figure 12:
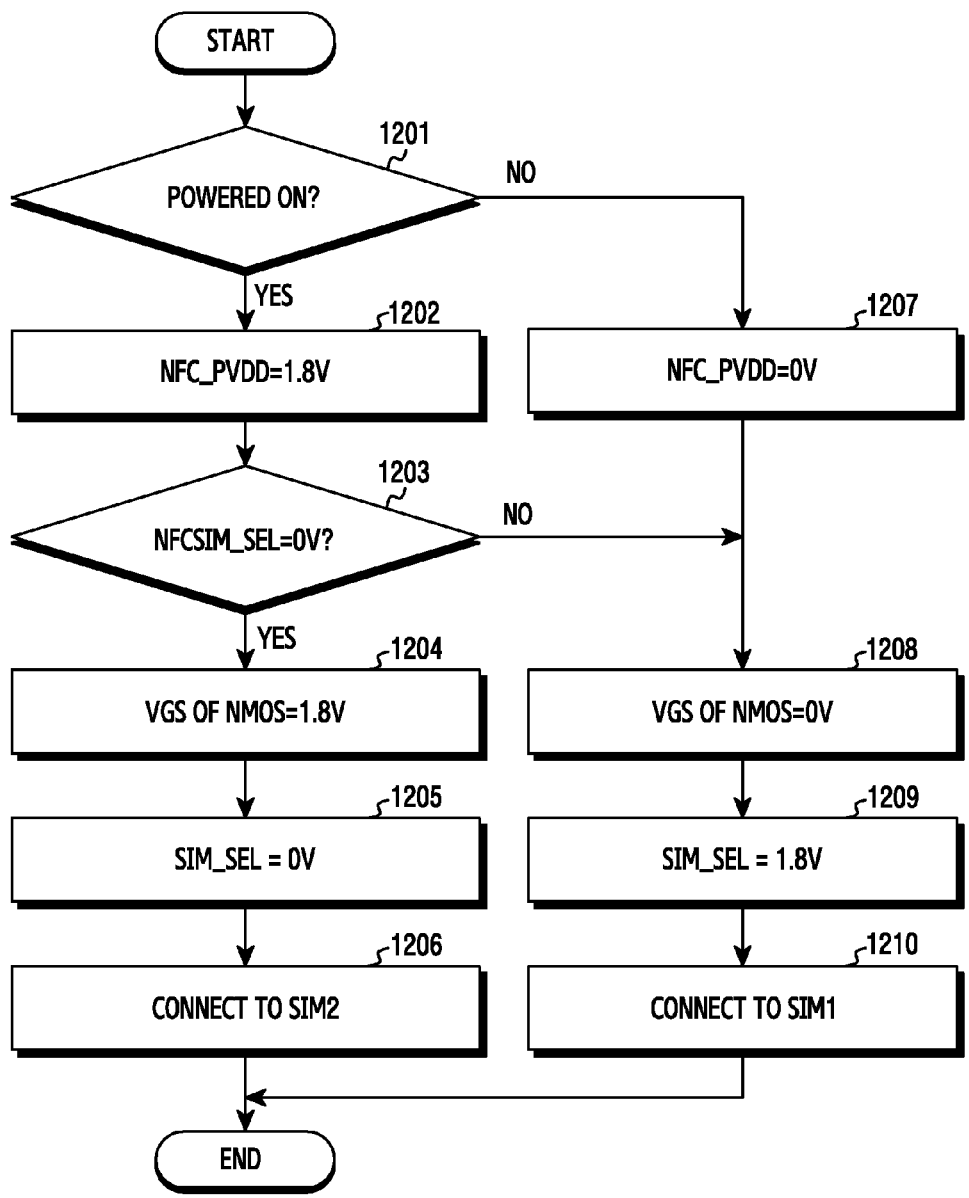
FIG. 12 is a flowchart of an example of a process, according to various embodiments of the present disclosure.

FIG. 12 is a flowchart of an example of a process, according to aspects of the disclosure. Hereinafter, an example will be described in which an electronic device has a first SIM, which is a main SIM, and a second SIM, which is a sub SIM.

In operation 1201, the electronic device may determine whether the electronic device is powered on or not.

In operation 1202, when the electronic device is powered on, the electronic device may confirm that power of the NFC_PVDD is 1.8V. According to an embodiment, the electronic device may confirm that 1.8V is supplied to the gate line of the MOSFET.

In operation 1203, the electronic device may determine whether power of the NFCSIM_SEL is 0V or not. According to an embodiment, the electronic device may determine whether power applied to the source line of the MOSFET is 0V or not.

In operation 1204, the electronic device may confirm that the VGS of the NMOS is 1.8V. According to an embodiment, when power of the NFCSIM_SEL of the electronic device is 0V, the electronic device may confirm that the voltage between the gate and the source of the NMOS is 1.8V.

In operation 1205, the electronic device may confirm that power of the SIM_SEL is 0V. According to an embodiment, when the voltage difference between the gate and the source of the MOSFET of the electronic device is 1.8V, the output voltage of the drain of the MOSFET may be 0V.

In operation 1206, the electronic device may confirm that connection is made to the second SIM among SIMs provided in the electronic device. According to an embodiment, when the voltage of the drain of the MOSFET is 0V, the switch may be connected to the second SIM, which is a sub SIM.

In operation 1207, when the electronic device is powered off, the electronic device may confirm that power of the NFC_PVDD is 0V. According to an embodiment, the electronic device may confirm that power is not supplied to the gate line of the MOSFET.

In operation 1208, when power of the NFCSIM_SEL of the electronic device is 0V, the electronic device may confirm that the voltage between the gate and the source of the NMOS is 0V.

In operation 1209, the electronic device may confirm that power of the SIM_SEL is 1.8V. According to an embodiment, when the voltage difference between the gate and the source of the MOSFET is 0V, the electronic device may confirm that, since the SIM_SEL has been pulled up to 1.8V, power of the SIM_SEL is 1.8V.

In operation 1210, the electronic device may confirm that connection is made to the first SIM among SIMs provided in the electronic device. According to an embodiment, when the voltage of the drain of the MOSFET is 1.8V, the switch may be connected to the first SIM, which is a main SIM.

Figure 13:
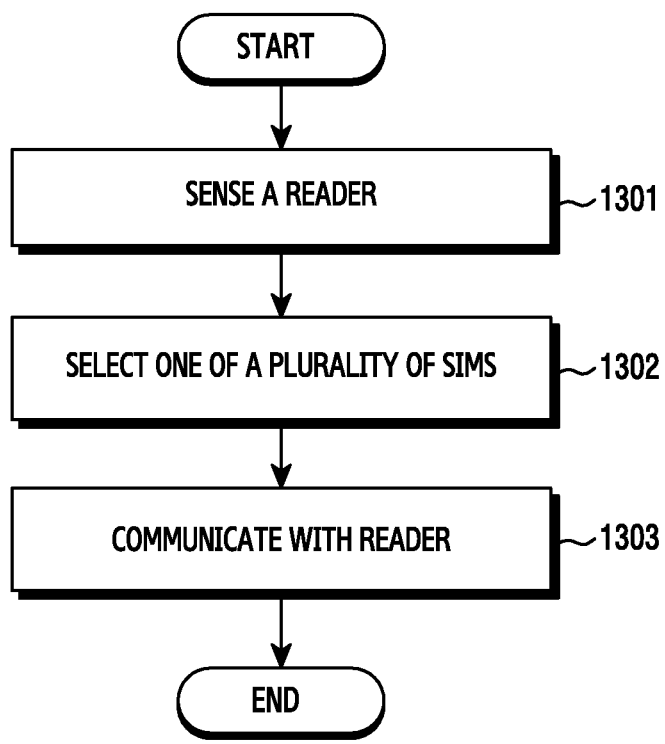
FIG. 13 is a flowchart of an example of a process, according to various embodiments of the present disclosure.

FIG. 13 is a flowchart of an example of a process, according to various embodiments of the present disclosure. As illustrated in FIG. 13, in operation 1301, the electronic device may sense that a reader is positioned within a preset distance. According to an embodiment, the electronic device may sense that a reader is positioned within a preset distance, within which the electronic device can perform near-field communication.

In operation 1302, the electronic device may determine one SIM, which is to perform communication with a reader, from at least two SIMs. According to an embodiment, when one of a plurality of SIMs provided in the electronic device has been selected in advance, the electronic device may identify the selected SIM as a SIM to perform communication with a reader by using a configuration setting stored in a memory of the electronic device or elsewhere.

According to an embodiment, the electronic device may determine whether one of at least one installed application is being executed or not; when one application is being executed, and if one SIM has been has been associated in advance with the application, the electronic device may choose the associated SIM to perform communication with a reader. For example, the electronic device may identify the associated SIM based on a configuration setting that designates the SIM for use in exchanging communications with a reader when the application is running.

According to an embodiment, when the NFC module is enabled, the electronic device may display a SIM selection window, which is divided into at least two areas, receive selection of one area from the displayed SIM selection window, and determine the SIM, which corresponds to the selected area, as a SIM to perform communication with a reader.

According to an embodiment, the electronic device may determine whether the electronic device is powered on or not and, when powered off, identify a SIM, which has been selected in advance from the plurality of SIMs, as a SIM to perform communication with a reader while the electronic device is powered off. For example, the electronic device may determine the SIM based on a configuration setting that designates the SIM for use in exchanging communications with a reader when the electronic device is powered off.

In operation 1303, the electronic device may communicate with the reader using information stored in the selected SIM.

According to various embodiments of the present disclosure, a method for performing operations by an electronic device having at least two SIMs may include the operations of: sensing a reader within a preset distance; determining one from the at least two SIMs; and communicating with the reader using information stored in the determined SIM.

According to various embodiments, the determining of one from the at least two SIMs may include: determining whether one of the at least two SIMs is previously set; and determining, when one of the at least two SIMs is previously set, the set SIM from the at least two SIMs.

According to various embodiments, the determining of one from the at least two SIMs may include: determining whether one of at least one application installed in the electronic device is executed; determining, when one of the at least one application is executed, whether one of the at least two SIMs is previously set corresponding to the executed application; and determining, when one of the at least two SIMs is previously set corresponding to the executed application, the set SIM from the at least two SIMs.

According to various embodiments, the method may further include: confirming that one of at least one application installed in the electronic device is executed; receiving a command for displaying a SIM selection menu including at least two SIM selection areas while one of the at least one application is executed; receiving a selection of one from the at least two SIM selection areas; and determining one from the at least two SIMs corresponding to the selected area.

According to various embodiments, the method may further include: receiving a command for displaying a SIM selection menu including at least two SIM selection areas; receiving a selection of one from the at least two SIM selection areas; and determining one from the at least two SIMs corresponding to the selected area.

According to various embodiments, the method may further include: outputting a message for guiding the determined SIM.

According to various embodiments, the determining of one from the at least two SIMs may include: displaying, when a near-field communication module is enabled, a SIM selection window, which is divided into at least two areas; receiving a selection of one from the at least two areas; and determining one from the at least two SIMs corresponding to the selected area.

According to various embodiments, the determining of one from the at least two SIMs may include: displaying a SIM selection window, which is divided into at least two areas; receiving a selection of one from the at least two areas; and determining one from the at least two SIMs corresponding to the selected area.

According to various embodiments, the determining of one from the at least two SIMs may include: determining whether a power supply is turned off; and determining, when the power supply is turned off, one previously set from the at least two SIMs.

According to various embodiments, the method may further include: receiving a command for turning off a power supply; and outputting a message for guiding the determined SIM.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

FIGS. 1-13 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method comprising:
while a power supply of an electronic device is turned on, detecting, by a processor, that a communication module is enabled by a reader which is contacted with or located in proximity to an electronic device;
determining, by the processor, a Service Identification Module (SIM) associated with an application being executed on the electronic device from a plurality of SIMs that are available in the electronic device;
switching, by the processor, a switch to connect the communication module with the determined SIM;
communicating, by the communication module, with the reader based on information stored in the determined SIM; and
while the power supply is turned off, the switch is switched to connect the communication module to a SIM designated for use while the power supply is turned off.

2. The method of claim 1, wherein the SIM is determined based on a configuration setting pre-stored in the electronic device.

3. The method of claim 1, wherein the SIM is determined based on whether a predetermined application is being executed when the reader is sensed.

4. The method of claim 1, further comprising:
detecting that an application installed in the electronic device is being executed; and
detecting a command for displaying a SIM selection menu,
wherein the SIM is determined based on an input to the menu.

5. The method of claim 1, further comprising detecting a command for displaying a SIM selection menu, wherein the SIM is determined based on an input to the menu.

6. The method of claim 5, further comprising outputting a message displaying information related to the determined SIM.

7. The method of claim 1, further comprising displaying a SIM selection menu in response to the communication module being enabled, wherein the SIM is determined by using the menu.

8. The method of claim 1, further comprising displaying a SIM selection menu identifying each of the plurality of SIMs, wherein the SIM is determined by using the menu.

9. The method of claim 1, further comprising outputting a message guiding the SIM designated for use while the power supply is turned off in response to detecting a command for turning off a power supply of the electronic device.

10. The method of claim 1, further comprising:
communicating, by the communication module, with the reader based on information stored in the designated SIM while the power supply is turned off.

11. An electronic device comprising:
a plurality of Service Identification Modules (SIMs);
a communication module;

a switch configured to connect the communication module with one of the plurality of SIMs; and a processor configured to:
while a power supply of an electronic device is turned on, detect that the communication module is enabled by a reader which is contacted with or located in proximity to the electronic device,
determine a SIM associated with an application being executed on the electronic device from the plurality of SIMs, and
control the switch to connect the communication module with the determined SIM,
wherein the communication module communicates with the reader based on information stored in the determined SIM or the designated SIM, and
wherein the switch is, while the power supply is turned off, switched to connect the communication module to a SIM designated for use while the power supply is turned off.

12. The electronic device of claim 11, wherein the SIM is determined based on a configuration setting pre-stored in the electronic device.

13. The electronic device of claim 11, wherein the SIM is determined based on whether a predetermined application is being executed when the reader is sensed.

14. The electronic device of claim 11, wherein the display is further configured to display a SIM selection menu, and the processor is further configured to:
detect that an application installed in the electronic device is being executed,
detect a command for displaying the SIM selection menu, and
wherein the SIM is determined based on an input to the menu.

15. The electronic device of claim 11, wherein the display is further configured to display a SIM selection menu, and the processor is further configured to detect a command for displaying the SIM selection menu, wherein the SIM is determined based on an input to the menu.

16. The electronic device of claim 15, wherein the processor is configured to output a message displaying information related to the determined SIM.

17. The electronic device of claim 11, wherein the processor being further configured to display a SIM selection menu in response to the communication module being enabled, wherein the SIM is determined by using the menu.

18. The electronic device of claim 11, wherein the processor is further configured to display a SIM selection menu identifying each of the plurality of SIMs, wherein the SIM is determined by using the menu.

19. The electronic device of claim 11, wherein the processor is to output a message guiding the SIM designated for use while the power supply is turned off in response to detecting a command for turning off the power supply of the electronic device.

20. The electronic device of claim 11, wherein the communication module is further configured to communicate, while the power supply is turned off, with the reader based on information stored in the designated SIM.

21. An electronic device comprising:
a plurality of Service Identification Modules (SIMs);
a communication module;
a switch configured to connect the communication module with one of the plurality of SIMs; and
a processor configured to:
detect that the communication module is enabled by a reader which is contacted with or located in proximity to the electronic device,
determine a SIM associated with an application being executed on the electronic device from the plurality of SIMs,
control the switch to connect the communication module with the determined SIM during a power-on of the electronic device, and
control the switch to connect the communication module with a pre-designated SIM for use during a power-off of the electronic device,
wherein the communication module communicates with the reader based on information stored in the determined SIM or the pre-designated SIM.

* * * * *